United States Patent Office

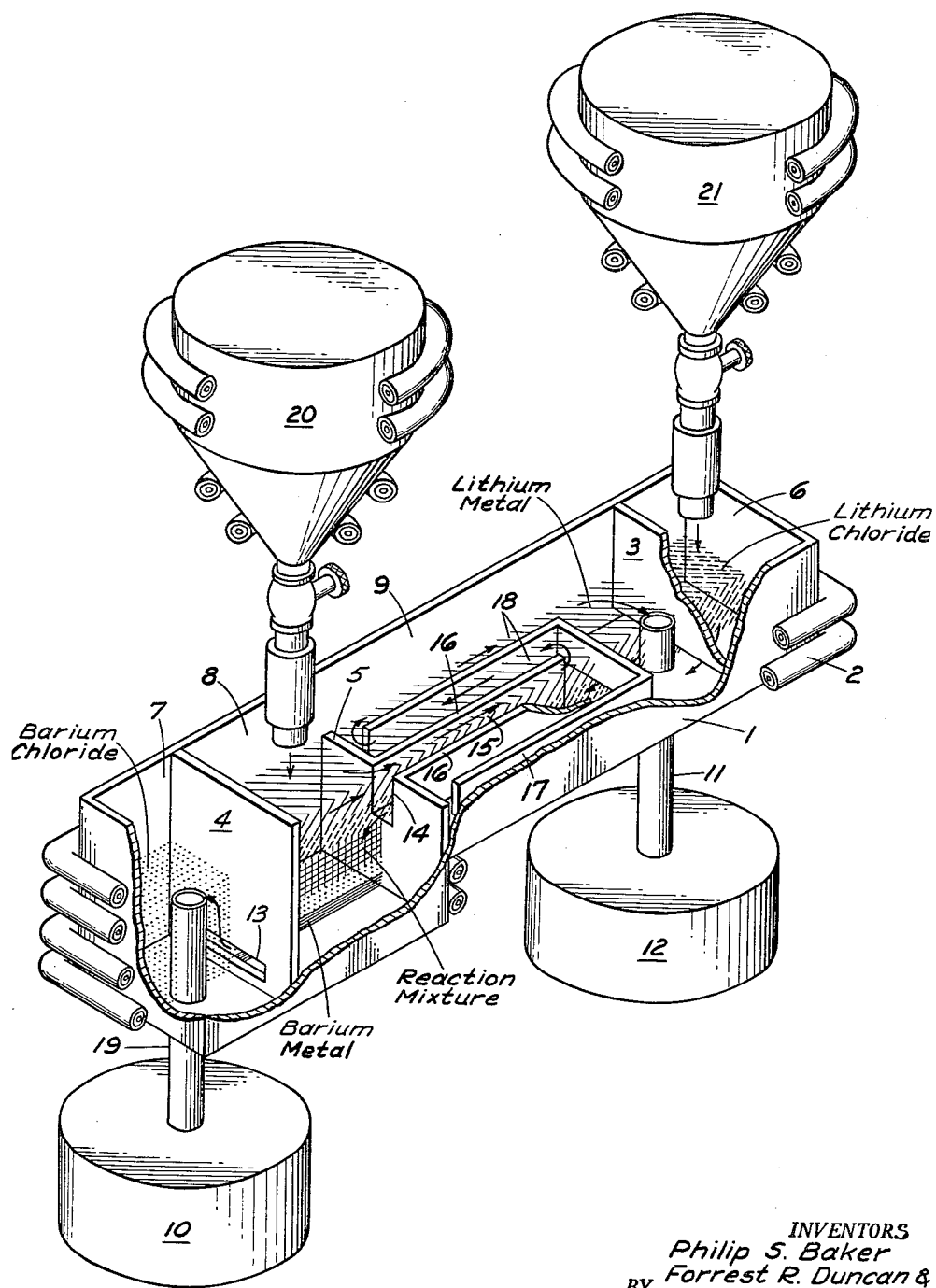

2,997,289
Patented Aug. 22, 1961

---

2,997,289
APPARATUS FOR THE PRODUCTION OF LITHIUM METAL
Philip S. Baker, Forrest R. Duncan, and Harold B. Greene, Oak Ridge, Tenn., assignors to the United States of America as represented by the United States Atomic Energy Commission
Filed Aug. 11, 1954, Ser. No. 449,285
2 Claims. (Cl. 266—34)

Our invention relates to a method and apparatus for the production of lithium metal of high purity and more particularly to a continuous method for the reduction of a lithium halide to the metal.

Lithium has been acquiring increased technological importance over the years. Lithium is used, for example, as a hardening agent in lead-base alloys. Some lithium compounds give a bright red color to a Bunsen flame and this property is utilized in pyrotechnical material. Pure lithium carbonate is required in medicine, and the molten metal is a widely regarded coolant for nuclear reactors.

Commercially, lithium metal is produced electrolytically from molten lithium chloride. On a smaller scale, relatively pure lithium has been obtained by the thermal reduction of molten lithium halides, or the oxide, with molten alkaline earth metals. In one such method, molten lithium chloride is contacted with molten barium in a batchwise manner. The reaction, however, does not go to completion, the electromotive series potentials of the metals being fairly close together, and a great number of separate, time-consuming purification operations are required to minimize barium contamination of the products and to recover lithium metal which has been entrapped in the reaction products. Moreover, the formation of a barium-lithium alloy causes still further difficulty: the time necessary to reach equilibrium is increased because all the barium actually present in the alloy is not immediately available for reaction, but yet must be removed in purification.

An object of our invention, therefore, is to provide an improved apparatus and method for the production of lithium metal of high purity.

Another object is to provide an apparatus and method for the continuous reduction of a lithium halide to the metal with an alkaline earth metal.

Another object is to provide an apparatus and method for the relatively rapid and simple continuous reduction of lithium chloride with barium to lithium metal of very high purity.

Additional objects and advantages of our invention will appear from the following description and the claims appended hereto.

In accordance with our invention, a lithium halide may be continuously reduced to the metal by continuously introducing a stream of molten lithium halide flowing substantially horizontally through a reaction zone, countercurrently contacting said lithium halide with a molten alkaline earth metal, permitting the resulting reaction mixture to stratify, continuously countercurrently withdrawing the resulting discretely defined alkaline earth halide product layer of the resulting stratified reaction mixture from said reaction zone over the resulting alkaline earth metal layer, and continously countercurrently withdrawing the resulting discretely defined lithium product layer of said stratified reaction mixture from said reaction zone over said molten lithium halide stream.

Our invention is a strikingly ingenious method of continuously reducing a lithium halide to lithium metal of high purity. Our lithium compares favorably in purity with lithium prepared by cumbersome, multi-step prior art methods and is suitable for such exacting requirements as basic academic studies, pharmaceutical purposes and very delicate tracer work.

Our reaction may be expressed by the following equation:

$$\text{Li halide} + M \rightarrow \text{Li} + M \text{ halide}$$

where M represents an alkaline earth metal. In countercurrently contacting the molten lithium compound with the molten alkaline earth metal, the heavier alkaline earth metal tends to pass through the lithium halide phase, reacting therewith to form molten lithium metal and the corresponding alkaline earth halide. We find that this results in the formation of clearly defined liquid layers, the following being in order of increasing densities: the lithium metal product, the lithium halide metal product, the lithium halide reactant, a reaction mixture comprising various reactants and products, the alkaline earth halide product and unreacted alkaline earth metal. Now, in withdrawing the lithium metal countercurrently over the lithium halide layer at a selected rate, not only is the desired product continuously obtained, but of even transcendent importance, the lithium is very conveniently, and without any additional processing, stripped of substantially all the alkaline earth metal entrained or alloyed therewith, since the latter will react with the lithium halide. Similarly, withdrawal of the alkaline earth halide product over the alkaline earth layer strips it of any entrained lithium halide, thereby further completing the consumption of the original reactants. Thus, our dual countercurrent stripping not only provides continuous operation but also contributes very significantly to the attainment of a lithium product of extremely high purity.

Although our invention may be satisfactorily employed in reacting any lithium halide with any alkaline earth metal, our invention is particularly adaptable for the reduction of lithium chloride with barium. Therefore, for clearer presentation, our invention will hereinafter be specifically illustrated with respect to this reduction.

In more detail, then, lithium chloride may be reduced to the metal by continuously introducing a stream of molten lithium chloride, preferably flowing substantially horizontally, into a reaction vessel maintained at a temperature of at least approximately 600° C., 850° C. being preferred, and under an atmosphere of a noble gas, such as argon, so as to form a layer of molten lithium chloride therein. Concurrently, molten barium is introduced into the reaction vessel at a point above the lithium chloride layer, so that the barium passes there-through by gravity, reacting with the lithium chloride to form barium chloride and lithium. The reactants and reaction products are then permitted to stratify into layers as determined by their respective densities, the layers being disposed within the reaction vessel in the following order, beginning with the uppermost layer: lithium; unreacted LiCl; a reaction mixture comprising barium, lithium chloride, barium chloride, and lithium; barium chloride; and unreacted barium. A part of the barium chloride reaction product layer is continuously withdrawn over the layer of unreacted barium, and any entrained lithium chloride is stripped by reaction with the barium, thereby furthering the consumption of the original reactants and increasing the product yield. Concurrently, a portion of the lithium product layer is withdrawn over the incoming stream of molten lithium chloride in countercurrent contact, stripping any barium alloyed therewith, and thereby increasing both product purity and yield.

A suitable system for effecting a preferred embodiment of our invention is illustrated diagrammatically in the accompanying drawing.

Referring to the drawing, the subject method may be conducted in a reactor 1 provided with heating means 2. The interior of the reactor is partitioned into four chambers by means of three transversely-disposed baffles, a lithium chloride baffle 3, a barium chloride baffle 4, and a lithium baffle 5. The lithium chloride baffle 3 is positioned adjacent an end of the reactor to form an endwise chamber 6 termed the lithium chloride inlet chamber. The barium chloride baffle 4 is positioned adjacent the other end of the reactor to form an endwise chamber 7 termed the barium chloride outlet chamber. The lithium baffle 5 is positioned between baffles 3 and 4 to form a reaction chamber 8 adjacent the barium chloride outlet chamber 7, and to form a barium-stripping chamber 9. The baffle 5 is of reduced height compared to baffles 3 and 4. The bottom of the reactor 1 is stepped so that the bases of chambers 6 and 9 lie in one plane, and the bases of chambers 7 and 8 lie in a lower plane.

A barium chloride withdrawal tube 19 extends downwardly through barium chloride chamber 7 into an external receiver 10. Similarly, a lithium withdrawal tube 11, within chamber 9 and closely adjacent to lithium chloride baffle 3, extends downwardly into an external lithium receiver 12.

The baffles 3, 4, and 5 are joined to the side walls of reactor 1. The lower edge of lithium chloride baffle 3 is spaced from the bottom of reactor 1. The barium chloride baffle 4 and lithium baffle 5 are joined to the bottom of the reactor. The baffle 4 is provided in its lower portion with a laterally-extending aperture 13. The upper edge of baffle 5 is cut away to form a port 14 which is in register with a barium-stripping channel 15, formed by two vertical and parallel walls 16, which extend upward from the base of stripping chamber 9 and join baffle 5. The top edges of walls 16 and baffle 5 lie in the same plane.

The walls 16, which do not extend for the full length of the chamber 9, are encompassed by a U-shaped baffle 17. The baffle 17 is spaced from walls 16 and the side walls of the reactor to form channels 18, which are in communication with channel 15. Thus, channel 15 and channels 18 together describe a barium-stripping labyrinth. The top edge of baffle 17 lies in the same plane as the top edge of lithium baffle 5. The lower edge of baffle 17 is spaced from the bottom of the reactor by a distance corresponding to that between the lower edge of lithium chloride baffle 3 and the bottom of the reactor. Spaced support pins (not shown) extend from the lower edge of baffle 17 to the base of chamber 9.

The lithium withdrawal tube 11 is positioned within chamber 9 at a point lower than the top edge of U-shaped baffle 17 and higher than the bottom edge of lithium chloride baffle 3. The aperture 13 in barium chloride baffle 4 is spaced from the bottom of chambers 7 and 8, and is positioned lower than port 14. The barium chloride withdrawal tube 19 is positioned within chamber 7 at a point somewhat lower than the top of lithium withdrawal tube 11.

In normal operation of the above apparatus, reactor 1 is covered, pressured slightly with a noble gas such as argon, and maintained at a temperature of about 850° C. Molten lithium chloride is introduced continuously to chamber 6 from a heated reservoir 21. As shown, the lithium chloride flows under baffles 3 and 17, forming a continuous layer over the bottom of barium-stripping chamber 9, and draining through channel 15 and port 14 into reaction chamber 8. There, it forms a discrete layer. Concurrently, molten barium is introduced into reaction chamber 8 from a suitably heated reservoir 20 which opens into the top of the chamber. The molten barium sinks through the lithium chloride and reacts therewith to form barium chloride and lithium. This results in the formation of the liquid layers referred to previously, the topmost layer being composed of metallic lithium.

The input flows of barium and lithium chloride can be adjusted to maintain the aforementioned liquid layers in the state of dynamic equilibrium indicated in the drawing. As shown, the barium chloride layer is positioned adjacent aperture 13, and thus barium chloride flows continuously into chamber 7, from which it drains by gravity through tube 19. Withdrawal of the barium chloride over the barium layer tends to strip the barium chloride of any entrained lithium chloride, thereby further consuming both of the original reactants. The Li produced in reaction chamber 8 floats on the aforementioned lithium chloride layer, flows countercurrently over the lithium chloride through the stripping labyrinth (channels 15 and 18) and drains by gravity into tube 11. Withdrawal of the product in this manner strips the lithium of contaminating barium, since the latter is converted into relatively heavy barium chloride, which is swept back into the reaction chamber 8 by the incoming lithium chloride stream.

In a suitable construction for laboratory use, the reactor was 15″ long, 3″ wide and 3″ high, and was constructed of 3/16″ stainless steel. The reactor was jacketed with brick for insulation purposes and heated by induction heating means girdling the brick.

In operation of the apparatus just described, approximately 200 grams LiCl containing approximately 8% impurities, principally Na and to a lesser extent K, and 86 grams Ba were charged into the reactor under an argon atmosphere over a half-hour period. The initial reactor temperature was approximately 600° C., which was raised to approximately 850° C. before conclusion of the run, at which latter temperature the reaction proceeded very rapidly. At four equal intervals, product was withdrawn from the lithium receiving vessel. Analysis showed that the first sample contained 5% impurities, the second 4%, the third 2.5% and the fourth 1.5%, the principal impurity being Ba alloyed with the Li.

It should be particularly noted that the purity of the product can be substantially increased, up to only approximately 0.5% impurities by our determinations, by extending the proportional length of the barium-stripping labyrinth.

The foregoing embodiment of our invention is representative of its preferred form, and it is to be understood that changes may be made by those skilled in the art. For example, our apparatus admits of various modifications, such as a single straight barium stripping channel of sufficient length or labyrinth shapes other than shown. The barium chloride baffle 4 need not be joined to the base of the reactor, but may be spaced therefrom in the same manner as the lithium chloride baffle 3. If desired, the reactor may be inclined somewhat from the horizontal to accelerate withdrawal of either barium chloride or lithium. It is not imperative that the reactor bottom be stepped, as shown, although this construction limits the amount of the lithium chloride in process and reduces the tie-up of that material. Some agitation of the countercurrent streams may be helpful, but such is not essential to good operation. Furthermore, although our process has been illustrated specifically with respect to the disclosed apparatus, it is understood that it may be conducted in other apparatus. Our process may be conducted in any apparatus that permits manual adjustment of points of introduction of the reactants and countercurrent, layer over layer withdrawal of the resulting lithium and barium chloride products for purification purposes. Therefore, our invention should be limited only as is indicated by the following claims.

Having thus described our invention, we claim as novel:

1. An apparatus for the continuous reduction of a lithium halide to lithium metal with an alkaline earth metal, which comprises a reaction vessel, three baffles disposed within said vessel and dividing same into four chambers, comprising two outer baffles provided with apertures in their lower portions, and an inner baffle provided with an aperture in its upper portion, barium halide withdrawal means in the outer chamber adjacent to one of said outer baffles, alkaline earth metal input means in the adjacent inner chamber, a lithium stripping channel in the succeeding inner chamber in register with said aperture of said inner baffle, lithium metal withdrawal means in said succeeding inner chamber, and lithium halide input means in the adjacent outer chamber.

2. An apparatus for the continuous reduction of lithium chloride to lithium metal with barium, which comprises a reaction vessel, three baffles disposed substantially transversely within said vessel and dividing same into four chambers, comprising a first outer baffle provided with an aperture in its lower portion, an inner baffle provided with an aperture in its upper portion and a second outer baffle spaced from the bottom of said vessel, barium chloride withdrawal means in the outer chamber adjacent to said first outer baffle, barium metal input means in the adjacent inner chamber, a lithium stripping labyrinth in the succeeding inner chamber in register with said aperture of said inner baffle, lithium metal withdrawal means at the exit of said succeeding inner chamber, and lithium chloride input means in the adjacent outer chamber.

References Cited in the file of this patent

UNITED STATES PATENTS

| | | |
|---|---|---|
| 1,815,946 | Langer | July 28, 1931 |
| 1,872,611 | Thurm | Aug. 16, 1932 |
| 2,028,390 | Hanson | Jan. 21, 1936 |
| 2,480,655 | Jackson et al. | Aug. 30, 1949 |
| 2,572,489 | Jordan | Oct. 23, 1951 |